United States Patent
Hinton et al.

[15] 3,679,764
[45] July 25, 1972

[54] PURIFICATION OF OXIDATIVE DEHYDROGENATION PROCESS EFFLUENTS

[72] Inventors: Robert A. Hinton, Lawrence, Kans.; John E. Cottle, Bartlesville, Okla.

[73] Assignee: Phillips Petroleum Company

[22] Filed: June 4, 1969

[21] Appl. No.: 830,398

[52] U.S. Cl...............................260/680 E, 203/7, 203/96, 203/39, 203/3, 203/33, 203/36, 203/37, 203/86, 260/683.3, 260/541, 260/540
[51] Int. Cl.....................B01d 3/38, C07c 7/00, C07c 11/22
[58] Field of Search ....................203/7, 95–97, 39, 203/33, 36, 37, 3, 86; 260/680 E, 681.5 R, 683.3, 541

[56] References Cited

UNITED STATES PATENTS

| | | | |
|---|---|---|---|
| 3,308,201 | 3/1967 | Bowers et al. | 260/681.5 |
| 3,414,482 | 12/1968 | Folz | 203/7 |
| 3,425,935 | 2/1969 | Cahn | 203/96 |
| 3,426,094 | 2/1969 | Karkalits | 260/681.5 |
| 3,471,371 | 10/1969 | Nagy et al. | 260/681.5 |
| 3,490,997 | 1/1970 | Barney et al. | 203/86 |
| 3,530,044 | 9/1970 | Horn | 203/7 |
| 3,535,399 | 10/1970 | Tabler | 260/681.5 |
| 3,536,775 | 10/1970 | Hutson et al. | 260/681.5 |
| 2,565,568 | 8/1951 | McCants | 203/17 |
| 3,293,154 | 12/1966 | Newton | 203/96 |

Primary Examiner—Wilbur L. Bascomb, Jr.
Attorney—Young and Quigg

[57] ABSTRACT

Water containing oxygenated hydrocarbons resulting from hydrocarbon oxidative dehydrogenation processes is rendered substantially non-toxic by stripping with steam to remove the oxygenated hydrocarbons including carbonyls and returning to the oxidative dehydrogenation process to suppress the formation of additional oxygenated hydrocarbons and the conversion of a portion of the steam stripped water to steam for use as stripping medium. The steam stripped water phase can be neutralized with a base prior to reboiling and converted to steam for use as the stripping medium.

10 Claims, 1 Drawing Figure

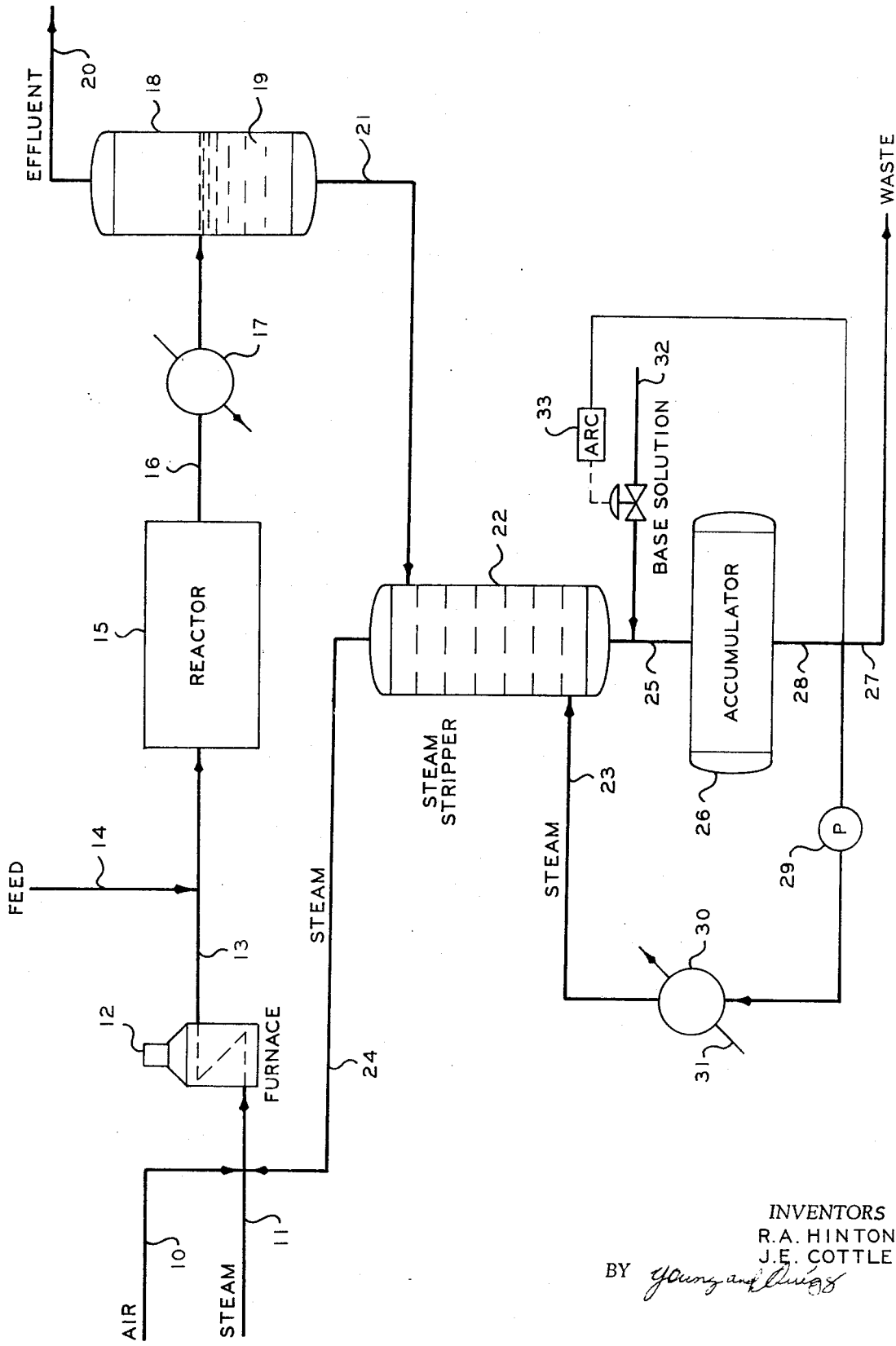

PURIFICATION OF OXIDATIVE DEHYDROGENATION PROCESS EFFLUENTS

BACKGROUND OF THE INVENTION

This invention relates to the purification of a water stream obtained as an effluent from an oxidative dehydrogenation process. In accordance with another aspect, this invention relates to the steam stripping of a water stream containing oxygenated hydrocarbons including carbonyls resulting from hydrocarbon oxidative dehydrogenation processes to recover the oxygenated hydrocarbons and recycle same to the oxidative dehydrogenation process to suppress the formation of additional oxygenated hydrocarbons. In accordance with a further aspect, this invention relates to the purification of water containing oxygenated hydrocarbons resulting from hydrocarbon oxidative dehydrogenation processes by a combination of steps comprising steam stripping and neutralization whereby water substantially freed of oxygenated hydrocarbons can be converted into steam for use as steam stripping medium and the remainder passed as a non-toxic material to waste disposal.

It is conventional in the petroleum industry to catalytically dehydrogenate n-butane over a catalyst such as chromium oxide deposited on an alumina base or carrier to produce an effluent comprising butenes and butadiene. The resulting effluent with or without intermediate separation steps is then subjected to further dehydrogenation in contact with a butene dehydrogenation catalyst to convert the butenes to butadiene, the latter being separated as a product.

A conventional catalyst for butene dehydrogenation comprises iron oxide, chromium oxide, and an alkali metal carbonate, such as potassium carbonate. Operation with this catalyst in the presence of relatively large concentrations of steam promotes the water-gas reaction and maintains the catalyst substantially free of carbonaceous deposits as long as there is an effective concentration of the carbonate present in the catalyst.

In a more recent butene dehydrogenation process known as oxidative dehydrogenation, an oxygen-containing gas is fed to the catalytic reaction zone containing a catalyst such as stannic phosphate along with the butenes feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversions and per-pass yields of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

It has been found that a small percentage of the olefin feed is converted to oxygenated hydrocarbons such as carboxylic acids, aldehydes, ketones, etc., especially acetic and propionic acids and acetaldehydes; the nature and quantity of these compounds depending upon the conditions under which the dehydrogenation is effected. Under normal plant operating conditions, these oxygenated by-products will be ultimately vented to the atmosphere and/or discharged with waste water from the process depending upon the separation and recovery processes employed and their operating conditions. These by-products are toxic and result in damage to property, particularly crops and foliage, and are probable contributors to photochemical smog and haze, especially when vented as aerosols. It is not only desirable to eliminate or at least reduce this source of air and water pollution, but such control is essential in many locations.

In the oxidative dehydrogenation of butene to butadiene, a ratio of about 30 moles of steam per mole of hydrocarbon is required in the reactor feed stream to maintain near optimum operating conditions. Some organic acids and other oxygenated hydrocarbon compounds are dissolved in the liquid phase when the steam is condensed from the reactor effluent mixture. Because the presence of these oxygenated compounds in the reactor feed will suppress further formation of these compounds in the reactor and thereby increase the selectivity of the reaction for production of butadiene, it is desirable to revaporize the water-acid mixture condensed from the reactor effluent and recycle it to the reactor. The presence of the acidic organic compounds necessitates the use of high quality stainless steel for the reboiler tubes to avoid corrosion. A cost estimate for the reboiler in a proposed operation was approximately three-quarters of a million dollars.

The present invention is directed in one aspect to a modified reboiler which will permit use of carbon steel rather than stainless steel construction material for the reboiler tubes. Such a change will decrease the cost of the reboiler heat exchanger bundle by 400 to 500 thousand dollars. These savings would be effected with a slight additional expenditure for a stainless steel or stainless steel clad stripper column, however, the cost of the stripper column would be a minor fraction of the savings realized in the reboiler cost.

Accordingly, one object of this invention is to provide an improved process for the oxidative dehydrogenation of hydrocarbons.

It is another object of this invention to provide a process for the minimization and elimination of oxygenated hydrocarbons from dehydrogenation effluents.

It is yet another object of this invention to provide an oxidative dehydrogenation process recovery system employing more economical processing equipment.

A further object of this invention is to provide a process for the recovery of oxygenated hydrocarbons in dehydrogenation effluents and reuse in the process.

A further object of this invention is to provide a process for suppressing the formation of additional oxygenated hydrocarbons in an oxidative dehydrogenation process.

STATEMENT OF THE INVENTION

In accordance with the invention, quench water obtained from an oxidative dehydrogenation process is steam stripped to recover an overhead product of steam containing oxygenated hydrocarbons including carbonyls, which stream is recycled directly to the dehydrogenation reaction zone to suppress the formation of additional oxygenated hydrocarbons.

Further, in accordance with the invention, steam-stripped quench water substantially freed of oxygenated hydrocarbons including carbonyls is neutralized and then converted to steam for use in the steam stripping of the quench water.

In accordance with one specific embodiment of the invention, a water phase separated from the effluent from an oxidative dehydrogenation process is countercurrently steam stripped in a stripping zone to recover overhead steam and a substantial portion of the oxygenated hydrocarbons present in the water phase, which stream is recycled directly to the oxidative dehydrogenation reactor and further wherein the water phase which has been steam stripped is neutralized by the addition of a base to control the pH at a value of about 7 prior to reboiling and converting at least a portion of same into steam for use in the stripping zone as a stripping medium.

DESCRIPTION OF THE PREFERRED EMBODIMENTS

In carrying out the invention, hydrocarbons are dehydrogenated in the presence of water, in the form of steam, and oxygen with the result that a minor amount of hydrocarbon feed is converted to oxygenated derivatives thereof to produce an effluent comprising reactant hydrocarbons, dehydrogenated hydrocarbons, oxygenated hydrocarbons and water. The reactant hydrocarbons and dehydrogenated hydrocarbons are separated from the remainder of the mixture, i.e., water and oxygenated hydrocarbons, by selective condensation of water and oxygenated hydrocarbons.

Hydrocarbons that can be dehydrogenated according to the process include those have two to 12 carbon atoms as represented by propane, butane, butenes, pentanes, pentenes, hexanes, hexenes, etc. Of special interest is the dehydrogenation of butenes to butadiene and the dehydrogenation of isoamylenes to isoprene. Catalysts that can be employed include stannic phosphate, iron stannate or stannite, tin-aluminum phosphate, etc. The amount of oxygen (air may be used) employed during the dehydrogenation ordinarily will be in the range of 0.1 to 3 volumes per volume of gaseous hydrocarbon feed. The amount of steam added to the feedstock passed to the dehydrogenation reactor will be in the range of 0.1 to 150 volumes per volume of gaseous hydrocarbon. The temperature for dehydrogenation will ordinarily be in the range of 800° to 1,200° F. The presently preferred hydrocarbons for dehydrogenation are the $C_4$ and $C_5$ hydrocarbons, especially the butenes and isoamylenes. The oxidative dehydrogenation process is well known in the art and is described in detail in U.S. Pat. No. 3,320,329.

The aqueous phase containing oxygenated hydrocarbons recovered by cooling the dehydrogenation effluent is passed according to the invention to a steam stripping step to produce a vapor phase having a substantial portion of the oxygenated hydrocarbons and a liquid residue phase which contains a minor portion of the oxygenated hydrocarbons. The liquid phase is preferably neutralized by the addition of an aqueous solution of a basic compound such as sodium sulfite, sodium bicarbonate, caustic, etc. to maintain a pH at near 7 by neutralizing any acidic compounds which are not stripped from the water. The neutralized water phase is vaporized in a reboiler and used as at least a portion of the steam for steam stripping the dehydrogenation reaction condensate containing the oxygenated hydrocarbons.

The portion of the neutralized steam stripped water phase not vaporized to produce steam can be disposed as waste or further treated, for example, to microbial degradation.

The method of this invention will be illustrated by a more detailed description of the preferred embodiment which is illustrated in the drawing.

The drawing illustrates an oxidative dehydrogenation system wherein air and steam are passed to furnace 12 by way of process lines 10 and 11, respectively, and are heated to a reaction temperature of about 1,050° F. After this, the conditionally combined stream is passed by way of line 13 when it is admixed with butene introduced by way of line 14 to reactor 15. The resultant mixture of air, steam and hydrocarbon feed, specifically butene, contacts a suitable dehydrogenation catalyst in zone 15 at a reaction temperature such as from about 800° to about 1,200° F. whereby the butene is converted at least partially to butadiene. The effluent from the dehydrogenation zone additionally contains oxygenated hydrocarbons including carbonyls. Conversion to butadiene with reaction residence times of about 0.2 to 1 second is about 70 percent based on hydrocarbon feed. The production of oxygenated hydrocarbons, e.g., $C_1$–$C_4$ ketones, aldehydes, carboxylic acids, etc., is a small percentage of the feed hydrocarbon. Water production rate depends primarily on the combination of oxygen with hydrogen abstracted from the butene feed. This rate of water production is about 125 pounds per hour (approximately 1 mole per mole of butene converted) where the butene and steam feed rates are about 560 and about 5,000 pounds per hour, respectively.

The reactant effluent comprising unreacted hydrocarbons, dehydrogenated butene, e.g., butadiene, oxygenated hydrocarbons, and water is removed from the reactor by way of line 16 and passed through condenser 17 wherein the water is substantially condensed to produce an aqueous phase containing a predominance of the oxygenated hydrocarbons contained in the reactor effluent. The condensate is passed to collection vessel 18 wherein the aqueous phase 19 containing oxygenated hydrocarbons is accumulated and the vaporous hydrocarbon phase is removed by way of line 20 and passed to purification and collection facilities.

Recycle of the condensate phase 19 containing oxygenated hydrocarbons to the dehydrogenation zone to suppress the formation of additional oxygenated hydrocarbons as well as to conserve water is, of course, desirable for economic reasons. However, an amount of water equivalent to that produced in the dehydrogenation zone must be discarded or accumulated in excess storage.

In accordance with the invention, the aqueous phase 19 containing oxygenated hydrocarbons in zone 18 is removed by way of line 21 and passed to the top of steam stripper 22. Steam is introduced into the base of stripping zone 22 by way of line 23 and countercurrently contacts water descending to column 22. Column 22 can be provided with suitable packing trays or other contact media effective for vapor-liquid contacting. The steam rising through stripping zone 22 removes a major portion of the oxygenated hydrocarbons present in the water phase introduced into the upper portion of the column. Steam and the oxygenated hydrocarbons stripped from the water phase are removed overhead from zone 22 by way of line 24 and returned to furnace 12 by introduction into steam line 11.

The temperatures maintained within stripping zone 22 will vary from 220° to 400° F. or higher depending on the pressure in the zone. In a preferred embodiment, a bottom column temperature of about 265° F. and a top column temperature of about 260° F. with the column operated at a pressure of about 35 psig is preferred. The ratio of water phase passed to the stripper via line 21 to stripping steam will be in the range of 0.75 to 1 to 1 to 1.

The water phase essentially stripped of oxygenated hydrocarbons is removed as bottoms from column 22 by way of line 25 and passed to kettle accumulator 26. A portion of the liquid accumulated in kettle 26 is removed to waste disposal or other handling by way of line 27, and the remainder is removed by way of line 28, passed through pump 29 and through reboiler heater 30 to elevate the temperature to form steam for introduction into column 22 through line 23. The amount of stripping with steam is preferably controlled so that an amount of water equivalent to the process demand rate is vaporized and returned to furnace 12 by way of lines 24 and 11. Reboiler 30 can be heated by way of an external source of steam introduced by way of line 31, the flow rate of which can be controlled by a temperature controller sensing the temperature in the upper portion of column 22. The rate of removal of steam plus oxygenated hydrocarbons in line 24 can be controlled by a flow rate controller set to pass a certain flow rate based upon the flow rate in line 11 so that a combined stream meeting the process demand rate is provided.

The steam-stripped water phase removed from the base of column 22 is neutralized by the addition of a base so as to heat water in reboiler 30 which is substantially neutral, i.e., a pH of 7. A base is introduced into line 25 by way of line 32. The addition of base through line 32 can be controlled by a pH meter 33 which senses the pH of the water removed from accumulator 26 and adjusts the valve controlling the flow rate of base introduced. Bases that can be employed include aqueous solutions of basic compounds such as sodium sulfite, sodium bicarbonate, caustic, etc. The amount of base added will be sufficient to maintain a pH near 7 by neutralizing the acidic compounds which are not steam stripped from the water in column 22. Aqueous sodium hydroxide is preferred for economic reasons.

By maintaining the pH of the water in the kettle accumulator 26 and heat exchanger 30 at near 7, one can use carbon steel heat exchange tubes and shell and other equipment. The construction of steam stripper 22 is preferably stainless steel or carbon steel coated with a polymer such as polytetrafluoroethylene (Teflon) or a polyphenylene sulfide polymer such as described in U.S. Pat. No. 3,354,129. The combination of stripping as described above and neutralization returns most of the carbonyls and other oxygenated hydrocarbons to the oxidative dehydrogenation reaction while permitting the use of an inexpensive carbon-steel reboiler in converting the quench water to the steam.

SPECIFIC EXAMPLE

Tests of the invention were made in a 30-tray, laboratory, glass fractionating column equipped with a conventional reboiler at the bottom and conventional overhead condenser and reflux equipment at the top. Water containing organic acids (measured as acetic acid) and other oxygenated compounds (measured by chemical oxygen demand, COD) was continuously passed to the top of the 30-tray fractionator. Sufficient aqueous sodium hydroxide was initially added to the fractionator reboiler kettle to maintain the contents at a pH below 7.0 during each entire test. The results are presented in Table I below:

TABLE 1

Summary of Continuous Process Water Evaporation & Steam Stripping Tests

| Test No. | 1 | 2 | 3 |
|---|---|---|---|
| Reflux Ratio | 24 to 1 | 1.5 to 1 | No reflux |
| Overhead product/ feed wt ratio | 1.09 | 1.11 | 0.991 |
| Kettle Boilup | (Approximately same for all 3 tests) | | |
| Analysis of overhead product at steady state conditions: | | | |
| Total organic acids as acetic acid, ppm | 65 | 315 | 425 |
| Total oxygenated compounds by chemical oxygen demand(COD), mg/l | 1264 | 1986 | 3380 |
| Calculated weight percents in overhead product based on amount in the feed: | | | |
| Total organic acids, wt % | 10.0 | 49.6 | 59.8 |
| Total oxygenated compounds by chemical oxygen demand (COD), mg/l | 33.8 | 54.1 | 82.4 |
| NOTE: Analyses of process water feed: | | | |
| Total organic acids as acetic acid, ppm | 705 | | |
| Total oxygenated compounds by chemical oxygen demand (COD), mg/l | 4068 | | |

Test 1 was made with a high reflux ratio of 24 to 1, i.e., a large amount of the overhead vapor was condensed and returned to the top of the fractionator as reflux. Only about 10 percent of the organic acids and 34 percent of the total oxygenated compounds in the feed water were recovered in the overhead vapor product. The second test was made with a reduced reflux ratio and the recovery of acids and total oxygenated compounds in the overhead product increased to 50 percent and 54 percent, respectively. Test 3 was made with no reflux, thus stimulating the operation of the stripper of our invention. The highest recovery of acids and total oxygenated compounds, e.g., 60 percent and 82 percent, respectively, was obtained with the operation of the fractionator as a true stripper, thus demonstrating the operability of our invention. Since the pH of the water bottoms in the reboiler was maintained below 7.0, it was proved that a carbon-steel exchanger could be used to reboil the bottoms liquid. A much cheaper reboiler exchanger may thus be used while still recovering and recycling the major proportion of the oxygenated compounds in the recycle steam. It is not possible, of course, to add caustic to the entire water phase 19 prior to conversion of same to steam for recycle to reactor 15 for although this would permit use of a carbon-steel reboiler it would destroy most of the oxygenated compounds by chemical conversion to salts. It would be highly undesirable to recycle the salts to the reactor 15 for the presence of salts would not suppress the formation of additional acids and other oxygenated compounds and thus the salt concentration in the cycle would increase until all equipment was fouled.

We therefore believe we have invented a novel and very useful method of recovering corrosive compounds from a liquid water stream and transferring said compounds to a gaseous water stream for recycle to a reaction step without the necessity of using expensive corrosion-resistant water-to-steam conversion equipment.

We claim:

1. A process for the oxidative dehydrogenation of hydrocarbons which comprises:
   a. contacting a dehydrogenatable feed comprising reactant paraffinic and olefinic hydrocarbons with an oxygen-containing gas and catalyst under dehydrogenation conditions to produce a reaction effluent comprising water, dehydrogenated reactant hydrocarbon, unconverted reactant hydrocarbon and oxygenated hydrocarbons comprising aldehydes, ketones and carboxylic acids formed from said reactant hydrocarbons during said contacting;
   b. separating dehydrogenated reactant hydrocarbon and unconverted reactant hydrocarbon from said effluent, leaving a water phase containing said oxygenated hydrocarbons;
   c. passing said water phase to a stripping zone and therein subjecting same to steam stripping to remove steam and a substantial portion of said oxygenated hydrocarbons overhead, and a stripped liquid aqueous phase substantially reduced in said oxygenated hydrocarbons as bottoms;
   d. reboiling at least a portion of said bottoms removed in step (c), converting same to steam and introducing same into said stripping zone to effect said steam stripping; and
   e. recycling said overhead removed in step (c) to step (a) for reuse in the process to suppress the production of additional oxygenated hydrocarbons.

2. A process according to claim 1 wherein an alkali metal basic compound is added to the liquid bottoms removed in step (c) to neutralize same prior to subjecting said bottoms to reboiling for steam stripping.

3. A process according to claim 1 wherein an alkali metal basic compound is added to the liquid bottoms removed in step (c) to neutralize same prior to subjecting the neutralized water to reboiling to form steam, and further wherein the reboiler is constructed of carbon steel and the stripping zone is constructed of stainless steel or carbon steel coated with an inert and corrosive-resistant material selected from polytetrafluoroethylene and polyphenylene sulfide.

4. A process according to claim 1 wherein the water phase to be steam stripped is fed to the top of the stripping zone in step (c) and moves downwardly countercurrently to rising steam introduced near the base of the stripping zone.

5. A process according to claim 1 wherein an alkali metal basic compound is added to the liquid bottoms removed in step (c) to neutralize same prior to subjecting the neutralized water to reboiling to form steam, and the amount of basic compound added is sufficient to maintain a pH at near 7 for the bottoms subjected to reboiling.

6. The process of claim 1 wherein said reactant hydrocarbons have from two to about 12 carbon atoms, said hydrocarbons in step (b) are separated from said water and oxygenated hydrocarbons by selective condensation of said water and oxygenated hydrocarbons to produce a hydrocarbon-rich vapor phase and a liquid phase comprising primarily water and oxygenated hydrocarbons, and said vapor and liquid phases are separated.

7. The process of claim 1 wherein said reactant hydrocarbons are dehydrogenated in the presence of water and oxygen and water is produced by said dehydrogenation, and said overhead removed from the stripper is recycled to said dehydrogenation at a rate equivalent to the water demand of said dehydrogenation.

8. The process of claim 1 wherein said feed to be dehydrogenated is a hydrocarbon feed rich in butenes.

9. A process for the oxidative dehydrogenation of hydrocarbons whereby the production of oxygenated hydrocarbons is minimized which comprises:
   a. contacting a dehydrogenatable feed comprising reactant paraffinic and olefinic hydrocarbons with an oxygen-containing gas and catalyst under dehydrogenation conditions to produce a reaction effluent comprising water, dehydrogenated reactant hydrocarbon, unconverted reactant hydrocarbon and oxygenated hydrocarbons comprising aldehydes, ketones and carboxylic acids formed from said hydrocarbons during said contacting;
   b. separating dehydrogenated reactant hydrocarbon and unconverted reactant hydrocarbon from said effluent, leaving a water phase containing said oxygenated hydrocarbons;
   c. steam stripping said water phase to recover overhead steam and a substantial portion of said oxygenated hydrocarbons present in the water phase, and as bottoms a stripped water phase substantially reduced in said oxygenated hydrocarbons; and
   d. recycling said overhead comprising steam and said oxygenated hydrocarbons directly to the oxidative dehydrogenation reaction in step (a) to suppress the formation of additional oxygenated hydrocarbons.

10. A process for removing corrosive compounds comprising aldehydes, ketones, and carboxylic acids from a water stream containing same which comprises:
   a. stripping said corrosive compounds from said water stream containing same by contacting said water stream with steam in a stripping zone,
   b. removing overhead from said stripping zone a vaporous stream comprising steam and a substantial portion of said corrosive compounds,
   c. removing from said stripping zone a bottoms water stream substantially free of said corrosive compounds,
   d. neutralizing said bottoms water stream by the addition of a neutralizing amount of an alkali metal basic compound thereto,
   e. reboiling at least a portion of the neutralized bottoms water stream to convert same to steam, and
   f. introducing the steam thus formed into the stripping zone as the source of stripping steam for step (a).

* * * * *